(12) United States Patent
Kiefer et al.

(10) Patent No.: US 7,727,651 B2
(45) Date of Patent: Jun. 1, 2010

(54) PROTON-CONDUCTING POLYMER MEMBRANE COMPRISING POLYMERS CONTAINING PHOSPHONIC ACID GROUPS AND ITS USE IN FUEL CELLS

(75) Inventors: Joachim Kiefer, Losheim am See (DE); Oemer Uensal, Mainz (DE); Gordon Calundann, North Plainfield, NJ (US)

(73) Assignee: BASF Fuel Cell GmbH (DE)

( * ) Notice: Subject to any disclaimer, the term of this patent is extended or adjusted under 35 U.S.C. 154(b) by 1395 days.

(21) Appl. No.: 10/522,839

(22) PCT Filed: Jul. 31, 2003

(86) PCT No.: PCT/EP03/09461

§ 371 (c)(1),
(2), (4) Date: Jun. 6, 2005

(87) PCT Pub. No.: WO2004/015802

PCT Pub. Date: Feb. 19, 2004

(65) Prior Publication Data

US 2005/0244694 A1    Nov. 3, 2005

(30) Foreign Application Priority Data

Aug. 2, 2002    (DE) ................ 102 35 358

(51) Int. Cl.
*H01M 8/10*    (2006.01)
(52) U.S. Cl. ............ 429/33; 429/42; 429/309; 429/314; 521/27
(58) Field of Classification Search ........ 521/27; 429/33, 42, 309, 314
See application file for complete search history.

(56) References Cited

U.S. PATENT DOCUMENTS

| | | | |
|---|---|---|---|
| 3,224,908 A | 12/1965 | Duch et al. | |
| 5,525,436 A | 6/1996 | Savinell et al. | |
| 5,738,905 A | 4/1998 | Bevers | |
| 5,761,793 A | 6/1998 | Bevers et al. | |
| 6,248,469 B1 * | 6/2001 | Formato et al. | 429/41 |
| 6,264,857 B1 * | 7/2001 | Kreuer et al. | 252/500 |
| 6,607,856 B2 * | 8/2003 | Suzuki et al. | 429/30 |
| 7,235,320 B2 * | 6/2007 | Calundann et al. | 429/30 |
| 7,288,603 B2 * | 10/2007 | Sakaguchi et al. | 525/411 |
| 7,332,530 B2 | 2/2008 | Kiefer et al. | |
| 2002/0045085 A1 | 4/2002 | Formato et al. | |
| 2004/0096734 A1 | 5/2004 | Calundann et al. | |
| 2004/0262227 A1 | 12/2004 | Kiefer et al. | |
| 2005/0053820 A1 | 3/2005 | Calundann et al. | |
| 2005/0074654 A1 | 4/2005 | Kiefer et al. | |
| 2005/0084727 A1 | 4/2005 | Kiefer et al. | |
| 2005/0118477 A1 | 6/2005 | Kiefer et al. | |
| 2005/0118478 A1 | 6/2005 | Kiefer et al. | |
| 2005/0147859 A1 | 7/2005 | Kiefer et al. | |
| 2005/0175879 A1 | 8/2005 | Kiefer et al. | |
| 2005/0181254 A1 | 8/2005 | Uensal et al. | |
| 2005/0256296 A1 | 11/2005 | Kiefer et al. | |
| 2006/0008690 A1 | 1/2006 | Uensal et al. | |
| 2006/0035095 A1 | 2/2006 | Calundann et al. | |
| 2006/0057449 A1 | 3/2006 | Calundann et al. | |
| 2006/0078774 A1 | 4/2006 | Uensal et al. | |
| 2006/0079392 A1 | 4/2006 | Baurmeister et al. | |
| 2006/0166067 A1 | 7/2006 | Kiefer et al. | |
| 2006/0183012 A1 | 8/2006 | Uensal et al. | |
| 2006/0210881 A1 | 9/2006 | Calundann et al. | |
| 2006/0234099 A1 | 10/2006 | Muellen | |
| 2007/0102361 A1 | 5/2007 | Kiefer et al. | |
| 2007/0292734 A1 * | 12/2007 | Kiefer et al. | 429/33 |
| 2008/0026277 A1 | 1/2008 | Peterson et al. | |
| 2008/0038624 A1 | 2/2008 | Belack et al. | |

FOREIGN PATENT DOCUMENTS

| | | |
|---|---|---|
| DE | 195 09 748 | 10/1996 |
| DE | 195 09 749 | 10/1996 |
| DE | 197 57 492 | 7/1999 |
| WO | WO-92/15121 | 9/1992 |
| WO | WO-96/13872 | 5/1996 |
| WO | WO-00/26982 | 5/2000 |
| WO | WO-01/18894 | 3/2001 |
| WO | WO 02/088219 | 11/2002 |
| WO | WO 2006/117199 | 11/2006 |

* cited by examiner

*Primary Examiner*—Peter D. Mulcahy
*Assistant Examiner*—Henry Hu
(74) *Attorney, Agent, or Firm*—Connolly Bove Lodge & Hutz LLP

(57) ABSTRACT

The present invention relates to a proton-conducting polymer membrane comprising polymers containing phosphonic acid groups which is obtainable by a process comprising the steps
A) mixing of vinyl-containing phosphonic acid with one or more aromatic tetraamino compounds with one or more aromatic carboxylic acids, esters thereof, acid halides thereof or anhydrides thereof which contain at least two acid groups per carboxylic acid monomer, and/or
mixing of vinyl-containing phosphonic acid with one or more aromatic and/or heteroaromatic diamino carboxylic acids, esters thereof, acid halides thereof or anhydrides thereof,
B) heating of the mixture obtainable according to step A) under inert gas at temperatures of up to 350° C. to form polyazole polymers,
C) application of a layer using the mixture from step A) and/or B) to a support,
D) polymerization of the vinyl-containing phosphonic acid present in the sheet-like structure obtainable according to step C).

26 Claims, No Drawings

PROTON-CONDUCTING POLYMER MEMBRANE COMPRISING POLYMERS CONTAINING PHOSPHONIC ACID GROUPS AND ITS USE IN FUEL CELLS

RELATED APPLICATIONS

This application is a national stage application (under 35 U.S.C. 371) of PCT/EP03/008461, filed Jul. 31, 2003, which claims benefit to German application number 102 35 358.1 filed Aug. 2, 2002.

The present invention relates to a proton-conducting polymer electrolyte membrane comprising polymers containing phosphonic acid groups, which can, owing to its chemical and thermal properties, be used in a variety of ways and is particularly useful as polymer electrolyte membrane (PEM) in PEM fuel cells.

A fuel cell usually comprises an electrolyte and two electrodes separated by the electrolyte. In a fuel cell, a fuel such as hydrogen gas or a methanol/water mixture is supplied to one of the two electrodes and an oxidant such as oxygen gas or air is supplied to the other electrode and chemical energy from the oxidation of the fuel is in this way converted directly into electric energy. Protons and electrons are formed in the oxidation reaction.

The electrolyte is permeable to hydrogen ions, i.e. protons, but not to reactive fuels such as the hydrogen gas or methanol and the oxygen gas.

A fuel cell generally comprises a plurality of individual cells known as MEUs (membrane-electrode units) which each comprise an electrolyte and two electrodes separated by the electrolyte.

Electrolytes employed for the fuel cell are solids such as polymer electrolyte membranes or liquids such as phosphoric acid. Recently, polymer electrolyte membranes have attracted attention as electrolytes for fuel cells. In principle, a distinction can be made between 2 categories of polymer membranes.

The first category encompasses cation-exchange membranes comprising a polymer framework containing covalently bound acid groups, preferably sulfonic acid groups. The sulfonic acid group is converted into an anion with release of a hydrogen ion and therefore conducts protons. The mobility of the protons and thus the proton conductivity is linked directly to the water content. Due to the very good miscibility of methanol and water, such cation-exchange membranes have a high methanol permeability and are therefore unsuitable for use in a direct methanol fuel cell. If the membrane dries, e.g. as a result of a high temperature, the conductivity of the membrane and consequently the power of the fuel cell decreases drastically. The operating temperatures of fuel cells containing such cation-exchange membranes are thus limited to the boiling point of water. Moistening of the fuels represents a great technical challenge for the use of polymer electrolyte membrane fuel cells (PEM-FCs) in which conventional, sulfonated membranes such as Nafion are used.

The materials used for polymer electrolyte membranes are, for example, perfluorosulfonic acid polymers. The perfluorosulfonic acid polymer (e.g. Nafion) generally has a perfluorinated hydrocarbon skeleton, e.g. a copolymer of tetrafluoroethylene and trifluorovinyl, and, bound thereto, a side chain bearing a sulfonic acid group, e.g. a side chain having a sulfonic acid group bound to a perfluoroalkylene group.

Disadvantages of these cation-exchange membranes are that the membrane has to be moistened, the operating temperature is limited to 100° C. and the membranes have a high methanol permeability. The reason for these disadvantages is the conductivity mechanism of the membrane in which the transport of protons is coupled to the transport of water molecules. This is referred to as the "vehicle mechanism" (K.-D. Kreuer, Chem. Mater. 1996, 8, 610-641).

The second category which has been developed encompasses polymer electrolyte membranes comprising complexes of basic polymers and strong acids. Thus, WO96/13872 and the corresponding U.S. Pat. No. 5,525,436 describe a process for producing a proton-conducting polymer electrolyte membrane, in which a basic polymer such as polybenzimidazole is treated with a strong acid such as phosphoric acid, sulfuric acid, etc.

J. Electrochem. Soc., Volume 142, No. 7, 1995, pp. L121-L123, describes the doping of a polybenzimidazole in phosphoric acid.

In the case of the basic polymer membranes known from the prior art, the mineral acid used for achieving the necessary proton conductivity (usually concentrated phosphoric acid) is usually added to the polyazole film after shaping. The polymer serves in this case as support for the electrolyte comprising the highly concentrated phosphoric acid. The polymer membrane fulfils further essential functions: in particular, it has to have a high mechanical stability and serve as separator for the two fuel cells mentioned at the outset.

A significant advantage of such a membrane doped with phosphoric acid is the fact that a fuel cell in which such a polymer electrolyte membrane is used can be operated at temperatures above 100° C. without the moistening of the fuels which is otherwise necessary. This is due to the ability of phosphoric acid to transport protons without additional water by means of the Grotthus mechanism (K.-D. Kreuer, Chem. Mater. 1996, 8, 610-641).

The possibility of operation at temperatures above 100° C. results in further advantages for the fuel cell system. Firstly, the sensitivity of the Pt catalyst to impurities in the gas, in particular CO, is greatly reduced. CO is formed as by-product in the reforming of hydrogen-rich gas comprising hydrocarbon compounds, e.g. natural gas, methanol or petroleum spirit, or as intermediate in the direct oxidation of methanol. The CO content of the fuel typically has to be less than 100 ppm at temperatures of <100° C. However, at temperatures in the range 150-200°, 10 000 ppm or more of CO can also be tolerated (N. J. Bjerrum et. al. Journal of Applied Electrochemistry, 2001, 31, 773-779). This leads to significant simplifications of the upstream reforming process and thus to cost reductions for the total fuel cell system.

A great advantage of fuel cells is the fact that in the electrochemical reaction the energy of the fuel is converted directly into electric energy and heat. Water is formed as reaction product at the cathode. Heat is thus produced as by-product in the electrochemical reaction. For applications in which only the electric power is utilized for driving electric motors, e.g. for automobile applications, or as widely usable replacement for battery systems, the heat has to be removed in order to avoid overheating of the system. Cooling then requires additional energy-consuming devices which further reduce the total electric efficiency of the fuel cell. In the case of stationary applications such as centralized or decentralized generation of power and heat, the heat can be utilized efficiently by means of existing technologies such as heat exchangers. To increase the efficiency, high temperatures are desirable. If the operating temperature is above 100° C. and the temperature difference between ambient temperature and the operating temperature is large, it becomes possible to cool the fuel cell system more efficiently or to use smaller cooling areas and dispense with additional equipment compared to fuel cells which, owing to membrane moistening, have to be operated below 100° C.

However, in addition to these advantages, a fuel cell system of this type also has disadvantages. Thus, the durability of membranes doped with phosphoric acid is relatively limited. The life is significantly reduced by, in particular, operation of the fuel cell below 100° C., for example at 80° C. However, it has to be said in this context that the fuel cell has to be operated at these temperatures when starting up and shutting down the cells.

Furthermore, the production of membranes doped with phosphoric acid is relatively expensive, since it is usual firstly to form a prepolymer which is subsequently cast with the aid of a solvent to produce a film. After drying of the film, this is doped with an acid in a last step.

In addition, the relatively low mechanical stability of a polyazole film doped with phosphoric acid presents a problem. Thus, the membrane can be damaged by the pressure generated by the gas serving as fuel which flows into the fuel cell if the mechanical stability is too low.

Furthermore, the performance, for example the conductivity, of known membranes is relatively limited.

It is also not possible to use the known membranes doped with phosphoric acid in the direct methanol fuel cell (DMFC). However, such cells are of particular interest since a methanol/water mixture is used as fuel. If a known membrane based on phosphoric acid is used, the fuel cell fails after quite a short time.

It is therefore an object of the present invention to provide a new type of polymer electrolyte membrane which solves the problems described above. In particular, the operating temperature range should be able to be extended to from <0° C. to 200° C. without the life of the fuel cell being greatly reduced.

A further object is to provide a polymer electrolyte membrane which can be used in many different fuel cells. Thus, the membrane should be suitable, in particular, for fuel cells which utilize pure hydrogen or numerous carbon-containing fuels, in particular natural gas, petroleum spirit, methanol and biomass, as energy source. In particular, the membrane should be able to be used in a hydrogen fuel cell and in a direct methanol fuel cell (DMFC).

Furthermore, a membrane according to the invention should be able to be produced inexpensively and simply. In addition, it was an object of the present invention to create polymer electrolyte membranes which have a high performance, in particular a high conductivity over a wide temperature range. Here, the conductivity, in particular at high temperatures, should be achieved without additional moistening.

Furthermore, a polymer electrolyte membrane which has a high mechanical stability, for example a high modulus of elasticity, a high tear strength and a high fracture toughness is to be created.

An additional object of the present invention was to provide a membrane which, in operation too, has a low permeability to a wide variety of fuels, for example hydrogen or methanol.

These objects are achieved by a proton-conducting polymer membrane comprising polymers containing phosphonic acid groups which has all of the features of claim 1. Furthermore, an electrode comprising a proton-conducting polymer coating based on polyazoles which has all the features of claim 20 achieves an object of the invention.

The present invention provides a proton-conducting polymer membrane comprising polymers containing phosphonic acid groups which is obtainable by a process comprising the steps A) mixing of vinyl-containing phosphonic acid with one or more aromatic tetraamino compounds with one or more aromatic carboxylic acids, esters thereof, acid halides thereof or anhydrides thereof which contain at least two acid groups per carboxylic acid monomer, and/or mixing of vinyl-containing phosphonic acid with one or more aromatic and/or heteroaromatic diamino carboxylic acids, esters thereof, acid halides thereof or anhydrides thereof, B) heating of the mixture obtainable according to step A) under inert gas at temperatures of up to 350° C. to form polyazole polymers, C) application of a layer using the mixture from step A) and/or B) to a support, D) polymerization of the vinyl-containing phosphonic acid present in the sheet-like structure obtainable according to step C).

A membrane according to the invention displays a high conductivity over a wide temperature range, and this is also achieved without additional moistening. Furthermore, a fuel cell equipped with a membrane according to the invention can also be operated at low temperatures, for example at 80° C., without the life of the fuel cell being greatly reduced as a result.

A polymer electrolyte membrane according to the invention has a very low methanol permeability and is suitable, in particular, for use in a DMFC. Long-term operation of a fuel cell using many fuels such as hydrogen, natural gas, petroleum spirit, methanol or biomass is thus possible.

Furthermore a membrane according to the invention can be produced simply and inexpensively. Thus, in particular, large amounts of expensive solvents which are hazardous to health, e.g. dimethylacetamide, can be dispensed with.

Furthermore, membranes according to the present invention have a high mechanical stability, in particular a high modulus of elasticity, a high tear strength and a high fracture toughness. Furthermore, these membranes have a surprisingly long life.

Vinyl-containing phosphonic acids are known to those skilled in the art. They are compounds which have at least one carbon-carbon double bond and at least one phosphonic acid group. The two carbon atoms which form the carbon-carbon double bond preferably have at least two, more preferably 3, bonds to groups which lead to low steric hindrance of the double bond. Such groups include, inter alia, hydrogen atoms and halogen atoms, in particular fluorine atoms. For the purposes of the present invention, the polyvinylphosphonic acid is the polymerization product obtained by polymerization of the vinyl-containing phosphonic acid either alone or with further monomers and/or crosslinkers.

The vinyl-containing phosphonic acid can have one, two, three or more carbon-carbon double bonds. Furthermore, the vinyl-containing phosphonic acid can contain one, two, three or more phosphonic acid groups.

In general, the vinyl-containing phosphonic acid contains from 2 to 20, preferably from 2 to 10, carbon atoms.

The vinyl-containing phosphonic acid used in step B) is preferably a compound of the formula

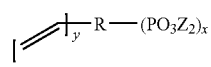

where

R is a bond, a C1-C15-alkyl group, C1-C15-alkoxy group, ethylenoxy group or C5-C20-aryl or heteroaryl group, with the above radicals themselves being able to be substituted by halogen, —OH, COOZ, —CN, NZ$_2$, the radicals Z are each, independently of one another, hydrogen, a C1-C15-alkyl group, C1-C15-alkoxy group, ethylenoxy group or C5-C20-aryl or heteroaryl group, with the above radicals themselves being able to be substituted by halogen, —OH, —CN, and x is 1, 2, 3, 4, 5, 6, 7, 8, 9 or 10, y is 1, 2, 3, 4, 5, 6, 7, 8, 9 or 10, and/or of the formula

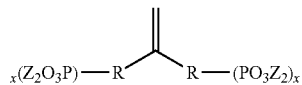

where

R is a bond, a C1-C15-alkyl group, C1-C15-alkoxy group, ethylenoxy group or C5-C20-aryl or heteroaryl group, with the above radicals themselves being able to be substituted by halogen, —OH, COOZ, —CN, NZ$_2$, the radicals Z are each, independently of one another, hydrogen, a C1-C15-alkyl group, C1-C15-alkoxy group, ethylenoxy group or C5-C20-aryl or heteroaryl group, with the above radicals themselves being able to be substituted by halogen, —OH, —CN, and x is 1, 2, 3, 4, 5, 6, 7, 8, 9 or 10, and/or of the formula

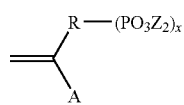

where

A is a group of the formulae COOR$^2$, CN, CONR$^2_2$, OR$^2$ and/or R$^2$, where R$^2$ is hydrogen, a C1-C15-alkyl group, C1-C15-alkoxy group, ethylenoxy group or C5-C20-aryl or heteroaryl group, with the above radicals themselves being able to be substituted by halogen, —OH, COOZ, —CN, NZ$_2$, R is a bond, a divalent C1-C15-alkylene group, divalent C1-C15-alkylenoxy group, for example ethylenoxy group, or divalent C5-C20-aryl or heteroaryl group, with the above radicals themselves being able to be substituted by halogen, —OH, COOZ, —CN, NZ$_2$, the radicals Z are each, independently of one another, hydrogen, a C1-C15-alkyl group, C1-C15-alkoxy group, ethylenoxy group or C5-C20-aryl or heteroaryl group, with the above radicals themselves being able to be substituted by halogen, —OH, —CN, and x is 1, 2, 3, 4, 5, 6, 7, 8, 9 or 10.

Preferred vinyl-containing phosphonic acids include, inter alia, alkenes containing phosphonic acid groups, e.g. ethenephosphonic acid, propenephosphonic acid, butenephosphonic acid; acrylic acid and/or methacrylic acid compounds containing phosphonic acid groups, for example 2-phosphonomethylacrylic acid, 2-phosphonomethylmethacrylic acid, 2-phosphonomethylacrylamide and 2-phosphonomethylmethacrylamide.

Particular preference is given to using commercial vinylphosphonic acid (ethenephosphonic acid) as is available, for example, from Aldrich or Clariant GmbH. A preferred vinylphosphonic acid has a purity of more than 70%, in particular 90% and particularly preferably more than 97%.

Furthermore, the vinyl-containing phosphonic acids can also be used in the form of derivatives which can subsequently be converted into the acid, with the conversion into the acid also being able to be carried out in the polymerized state. Derivatives of this type include, in particular, the salts, esters, amides and halides of the vinyl-containing phosphonic acids.

The mixture prepared in step A) preferably comprises at least 20% by weight, in particular at least 30% by weight and particularly preferably at least 50% by weight, based on the total weight of the mixture, of vinyl-containing phosphonic acid.

The mixture prepared in step A) can further comprise additional organic and/or inorganic solvents. Organic solvents include, in particular, polar aprotic solvents such as dimethyl sulfoxide (DMSO), esters such as ethyl acetate, and polar protic solvents such as alcohols, e.g. ethanol, propanol, isopropanol and/or butanol. Inorganic solvents include, in particular, water, phosphoric acid and polyphosphoric acid.

These can have a positive influence on the processability. In particular, addition of the organic solvent can improve the solubility of polymers formed, for example, in step B). The content of vinyl-containing phosphonic acid in such solutions is generally at least 5% by weight, preferably at least 10% by weight, particularly preferably in the range from 10 to 97% by weight.

The aromatic and heteroaromatic tetraamino compounds used according to the invention are preferably 3,3',4,4'-tetraaminobiphenyl, 2,3,5,6-tetraaminopyridine, 1,2,4,5-tetraaminobenzene, bis(3,4-diaminophenyl) sulfone, bis(3,4-diaminophenyl) ether, 3,3',4,4'-tetraaminobenzophenone, 3,3',4,4'-tetraaminodiphenylmethane and 3,3',4,4'-tetraaminodiphenyldimethylmethane and their salts, in particular their monohydrochloride, dihydrochloride, trihydrochloride and tetrahydrochloride derivatives.

The aromatic carboxylic acids used according to the invention are dicarboxylic acids and tricarboxylic acids and tetracarboxylic acids or esters thereof, anhydrides thereof or acid halides thereof, in particular acid chlorides thereof. The term aromatic carboxylic acids likewise encompasses heteroaromatic carboxylic acids. The aromatic dicarboxylic acids are preferably isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid, or C1-C20-alkyl esters or C5-C12-aryl esters thereof, or anhydrides thereof or acid chlorides thereof. The aromatic tricarboxylic acids, tetracarboxylic acids or C1-C20-alkyl esters or C5-C12-aryl esters thereof or anhydrides thereof or acid chlorides thereof are preferably 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid, 3,5,4'-biphenyltricarboxylic acid.

The aromatic tetracarboxylic acids or C1-C20-alkyl esters or C5-C12-aryl esters thereof or anhydrides thereof or acid chlorides thereof are preferably 3,5,3',5'-biphenyltetracarboxylic acid, 1,2,4,5-benzenetetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

The heteroaromatic carboxylic acids used according to the invention are heteroaromatic dicarboxylic acids and tricarboxylic acids and tetracarboxylic acids or esters thereof or anhydrides thereof. For the purposes of the present invention, heteroaromatic carboxylic acids are aromatic systems in which at least one nitrogen, oxygen, sulfur or phosphorus atom is present in the aromatic. Preference is given to pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also C1-C20-alkyl esters or C5-C12-aryl esters thereof, or anhydrides thereof or acid chlorides thereof.

The content of tricarboxylic acid or tetracarboxylic acids (based on dicarboxylic acid used) is in the range from 0 to 30 mol %, preferably from 0.1 to 20 mol %, in particular from 0.5 to 10 mol %.

The aromatic and heteroaromatic diamino carboxylic acids used according to the invention are preferably diaminobenzoic acid and its monohydrochloride and dihydrochloride derivatives.

Mixtures of at least 2 different aromatic carboxylic acids are preferably used in step A). Particular preference is given to using mixtures comprising not only aromatic carboxylic acids but also heteroaromatic carboxylic acids. The mixing ratio of aromatic carboxylic acids to heteroaromatic carboxylic acids is from 1:99 to 99:1, preferably from 1:50 to 50:1.

These mixtures are, in particular, mixtures of N-heteroaromatic dicarboxylic acids and aromatic dicarboxylic acids. Nonlimiting examples are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid. 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-dicarboxyphenyl) ether, benzophenone-4,4'-dicarboxylic acid, bis(4-carboxyphenyl) sulfone, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid.

If a very high molecular weight is to be achieved, the molar ratio of carboxylic acid groups to amino groups in the reaction of tetraamino compounds with one or more aromatic carboxylic acids or esters thereof which contain at least two acid groups per carboxylic acid monomer is preferably in the vicinity of 1:2.

The mixture prepared in step A) preferably comprises at least 2% by weight, in particular from 5 to 20% by weight, of monomers for producing polyazoles.

The polyazole-based polymer formed in step B) comprises recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVI) and/or (XVII) and/or (XVIII) and/or (XIX) and/or (XX) and/or (XXI) and/or (XXII)

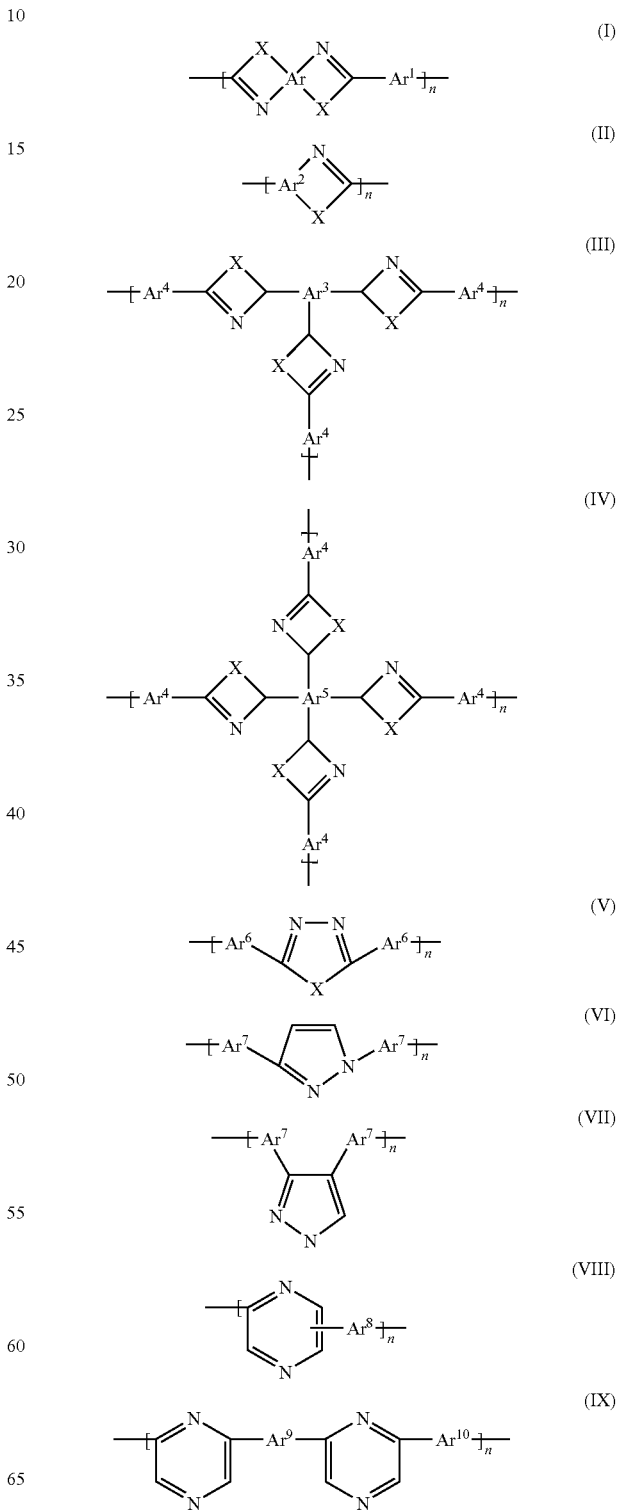

-continued

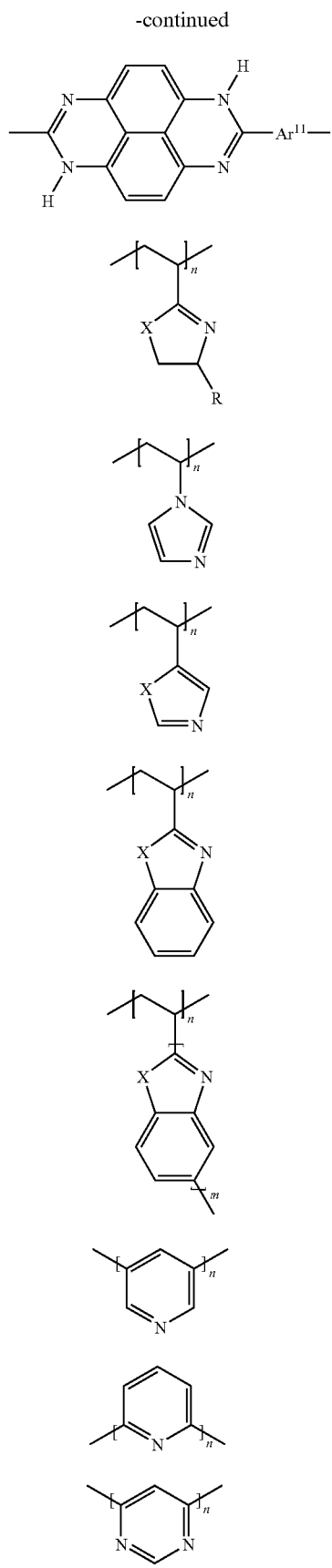

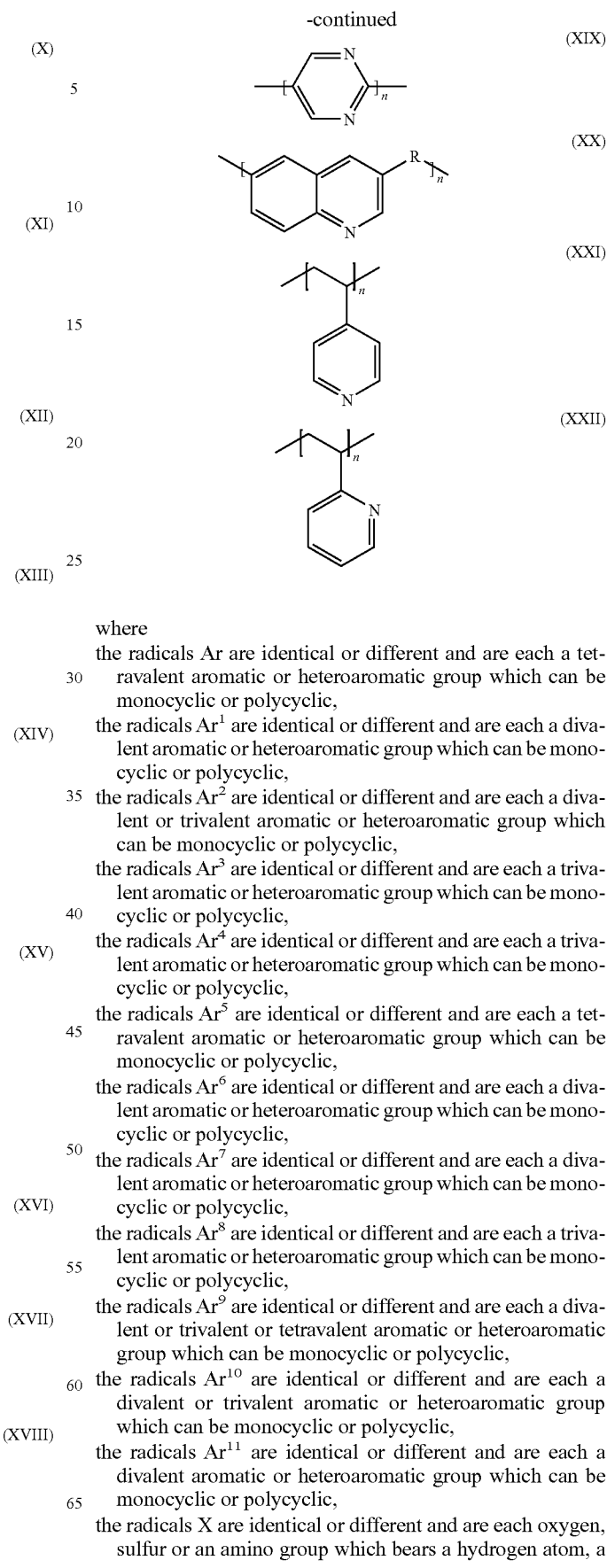

where
the radicals Ar are identical or different and are each a tetravalent aromatic or heteroaromatic group which can be monocyclic or polycyclic,
the radicals $Ar^1$ are identical or different and are each a divalent aromatic or heteroaromatic group which can be monocyclic or polycyclic,
the radicals $Ar^2$ are identical or different and are each a divalent or trivalent aromatic or heteroaromatic group which can be monocyclic or polycyclic,
the radicals $Ar^3$ are identical or different and are each a trivalent aromatic or heteroaromatic group which can be monocyclic or polycyclic,
the radicals $Ar^4$ are identical or different and are each a trivalent aromatic or heteroaromatic group which can be monocyclic or polycyclic,
the radicals $Ar^5$ are identical or different and are each a tetravalent aromatic or heteroaromatic group which can be monocyclic or polycyclic,
the radicals $Ar^6$ are identical or different and are each a divalent aromatic or heteroaromatic group which can be monocyclic or polycyclic,
the radicals $Ar^7$ are identical or different and are each a divalent aromatic or heteroaromatic group which can be monocyclic or polycyclic,
the radicals $Ar^8$ are identical or different and are each a trivalent aromatic or heteroaromatic group which can be monocyclic or polycyclic,
the radicals $Ar^9$ are identical or different and are each a divalent or trivalent or tetravalent aromatic or heteroaromatic group which can be monocyclic or polycyclic,
the radicals $Ar^{10}$ are identical or different and are each a divalent or trivalent aromatic or heteroaromatic group which can be monocyclic or polycyclic,
the radicals $Ar^{11}$ are identical or different and are each a divalent aromatic or heteroaromatic group which can be monocyclic or polycyclic,
the radicals X are identical or different and are each oxygen, sulfur or an amino group which bears a hydrogen atom, a group having 1-20 carbon atoms, preferably a branched or unbranched alkyl or alkoxy group, or an aryl group as further radical, the radicals R are identical or different and are each hydrogen, an alkyl group or an aromatic group, with the proviso that R in the formula XX is a divalent group, and n, m are each an integer greater than or equal to 10, preferably greater than or equal to 100.

Aromatic or heteroaromatic groups which are preferred according to the invention are derived from benzene, naphthalene, biphenyl, diphenyl ether, diphenylmethane, diphenyldimethylmethane, bisphenone, diphenyl sulfone, thiophene, furan, pyrrole, thiazole, oxazole, imidazole, isothiazole, isoxazole, pyrazole, 1,3,4-oxadiazole, 2,5-diphenyl-1,3,4-oxadiazole, 1,3,4-thiadiazole, 1,3,4-triazole, 2,5-diphenyl-1,3,4-triazole, 1,2,5-triphenyl-1,3,4-triazole, 1,2,4-oxadiazole, 1,2,4-thiadiazole, 1,2,4-triazole, 1,2,3-triazole, 1,2,3,4-tetrazole, benzo[b]thiophene, benzo[b]furan, indole, benzo[c]thiophene, benzo[c]furan, isoindole, benzoxazole, benzothiazole, benzimidazole, benzisoxazole, benzisothiazole, benzopyrazole, benzothiadiazole, benzotriazole, dibenzofuran, dibenzothiophene, carbazole, pyridine, bipyridine, pyrazine, pyrazole, pyrimidine, pyridazine, 1,3,5-triazine, 1,2,4-triazine, 1,2,4,5-triazine, tetrazine, quinoline, isoquinoline, quinoxaline, quinazoline, cinnoline, 1,8-naphthyridine, 1,5-naphthyridine, 1,6-naphthyridine, 1,7-naphthyridine, phthalazine, pyridopyrimidine, purine, pteridine or quinolizine, 4H-quinolizine, diphenyl ether, anthracene, benzopyrrole, benzooxathiadiazole, benzooxadiazole, benzopyridine, benzopyrazine, benzopyrazidine, benzopyrimidine, benzotriazine, indolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which may also be substituted.

$Ar^1$, $Ar^4$, $Ar^6$, $Ar^7$, $Ar^8$, $Ar^9$, $Ar^{10}$, $Ar^{11}$ can have any substitution pattern; in the case of phenylene, $Ar^1$, $Ar^4$, $Ar^6$, $Ar^7$, $Ar^8$, $Ar^9$, $Ar^{10}$, $Ar^{11}$ can be, for example, ortho-, meta- or para-phenylene. Particularly preferred groups are derived from benzene and biphenylene, which may also be substituted.

Preferred alkyl groups are short-chain alkyl groups having from 1 to 4 carbon atoms, e.g. methyl, ethyl, n- or i-propyl and t-butyl groups.

Preferred aromatic groups are phenyl and naphthyl groups. The alkyl groups and the aromatic groups may be substituted.

Preferred substituents are halogen atoms such as fluorine, amino groups, hydroxy groups or short-chain alkyl groups such as methyl or ethyl groups.

Preference is given to polyazoles having recurring units of the formula (I) in which the radicals X within one recurring unit are identical.

The polyazoles can in principle also have different recurring units which differ, for example, in their radical X. However, preference is given to only identical radicals X being present in a recurring unit.

Further preferred polyazole polymers are polyimidazoles, polybenzothiazoles, polybenzoxazoles, polyoxadiazoles, polyquinoxalines, polythiadiazoles, poly(pyridines), poly(pyrimidines) and poly(tetrazapyrenes).

In a further embodiment of the present invention, the polymer comprising recurring azole units is a copolymer or a blend comprising at least two units of the formulae (I) to (XXII) which differ from one another. The polymers can be in the form of block copolymers (diblock, triblock), random copolymers, periodic copolymers and/or alternating polymers.

In a particularly preferred embodiment of the present invention, the polymer comprising recurring azole units is a polyazole containing only units of the formula (I) and/or (II).

The number of recurring azole units in the polymer is preferably greater than or equal to 10. Particularly preferred polymers contain at least 100 recurring azole units.

For the purposes of the present invention, polymers comprising recurring benzimidazole units are preferred. Some examples of extremely advantageous polymers comprising recurring benzimidazole units are represented by the following formulae:

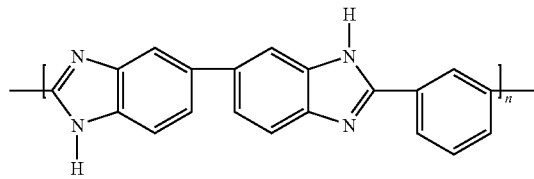
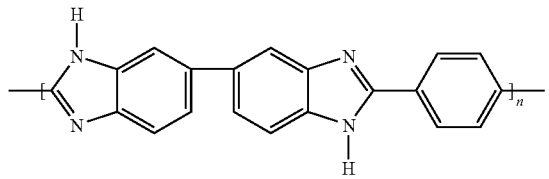
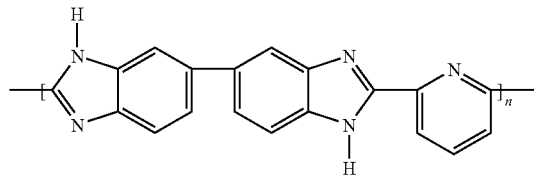
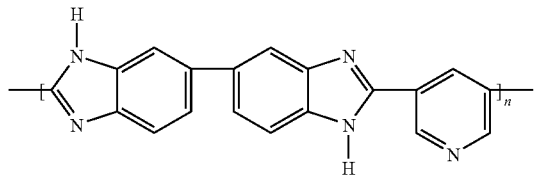
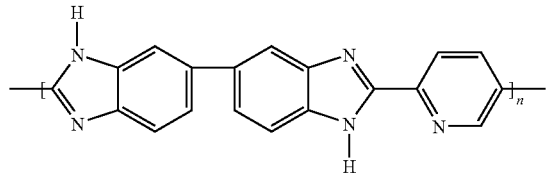
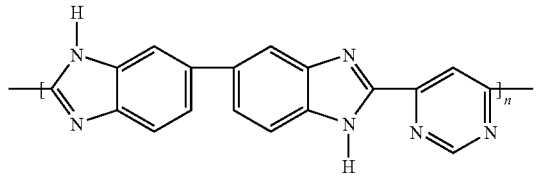

-continued
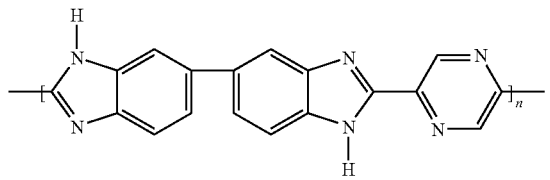
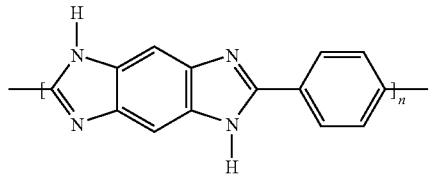
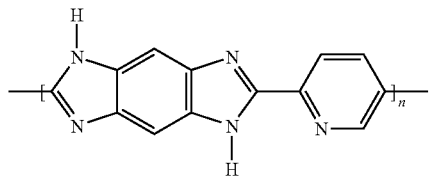
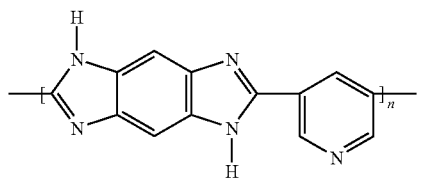
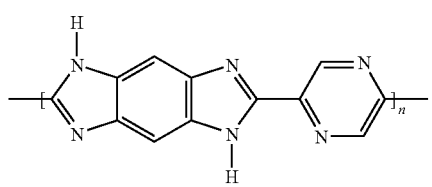
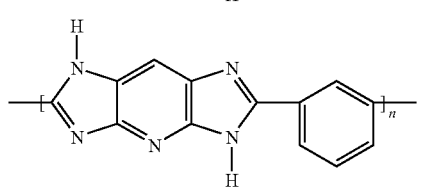
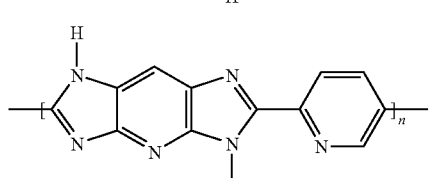
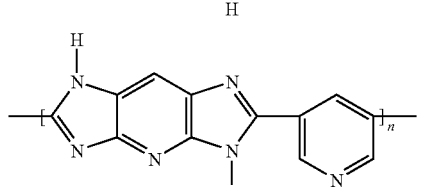
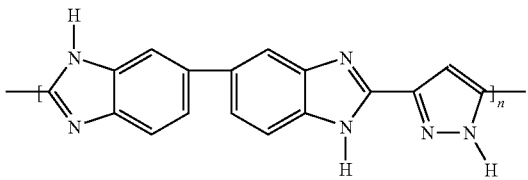
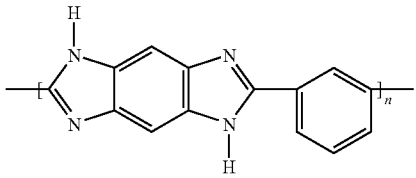
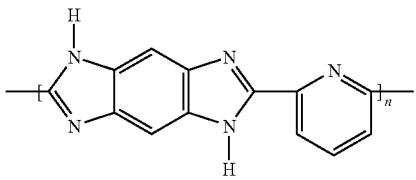
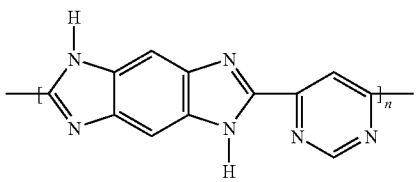
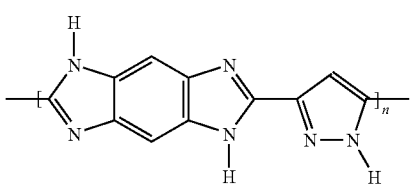
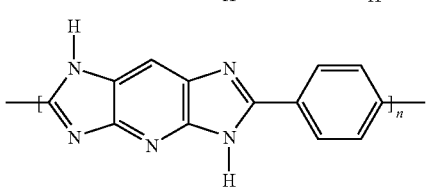
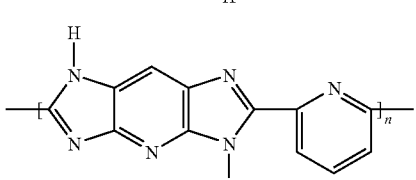
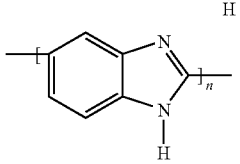
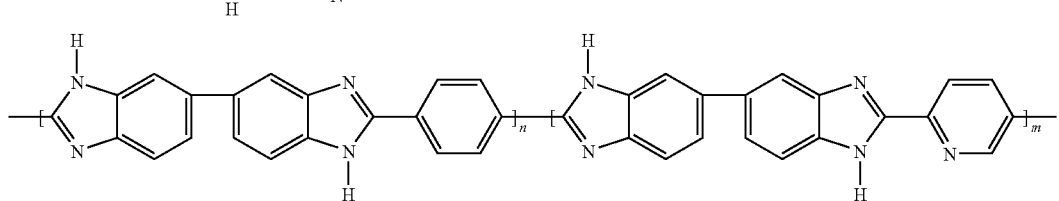

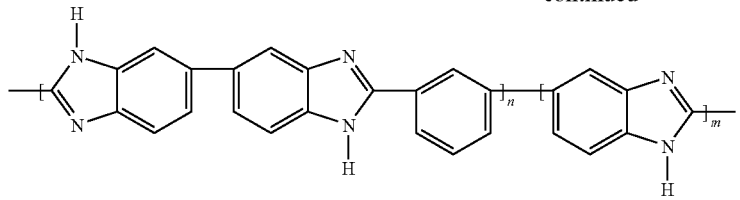

where n and m are each an integer greater than or equal to 10, preferably greater than or equal to 100.

The polyazoles which are obtainable by means of the process described, but in particular the polybenzimidazoles, generally have a high molecular weight. Measured as intrinsic viscosity, this is preferably at least 0.2 dl/g, preferably from 0.7 to 10 dl/g, in particular from 0.8 to 5 dl/g.

If tricarboxylic acids or tetracarboxylic acids are present in the mixture prepared in step A), they effect branching/crosslinking of the polymer formed. This contributes to an improvement in the mechanical properties.

The mixture obtained in step A) is heated to a temperature of up to 350° C., preferably up to 280° C., in particular up to 200° C. and preferably in the range from 100° C. to 250° C. and particularly preferably in the range from 100° C. to 200° C., in step B). An inert gas, for example nitrogen or a noble gas such as neon, argon, is used here.

In step B), reaction of the carboxylic acid groups with the amino groups occurs. Water is liberated in this reaction. According to a particular aspect of the present invention, the water formed in step B) is removed from the reaction equilibrium. Methods are well known to those skilled in the art. For example, the water can be distilled off. It is also possible for the water to be bound by desiccants. Depending on the type of desiccant, this can remain in the reaction mixture or be separated off from the reaction mixture. Desiccants which can be used are, inter alia, phosphorus pentoxide ($P_2O_5$) and silica gel.

In one variant of the process, the heating according to step B) can be carried out after formation of a sheet-like structure according to step C).

In a further embodiment of the invention, monomers capable of effecting crosslinking can be used. Depending on the thermal stability of the monomers, these can be added to the mixture in step A) or can be added after the preparation of the polyazoles in step B). Furthermore, the monomers capable of effecting crosslinking can also be applied to the sheet-like structure formed in step C).

The monomers capable of effecting crosslinking are, in particular, compounds which have at least 2 carbon-carbon double bonds. Preference is given to dienes, trienes, tetraenes, di(methylacrylates), tri(methylacrylates), tetra(methylacrylates), diacrylates, triacrylates, tetraacrylates.

Particular preference is given to dienes, trienes, tetraenes of the formula

di(methylacrylates), trimethylacrylates), tetra(methylacrylates) of the formula

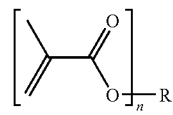

diacrylates, triacrylates, tetraacrylates of the formula

[structure]

where
R is a C1-C15-alkyl group, C5-C20-aryl group or heteroaryl group, NR', —$SO_2$, PR', Si(R')$_2$, with the above radicals being able to be in turn substituted,
the radicals R' are each, independently of one another, hydrogen, a C1-C15-alkyl group, C1-C15-alkoxy group, C5-C20-aryl or heteroaryl group and
n is at least 2.

The substituents of the abovementioned radical R are preferably halogen, hydroxyl, carboxy, carboxyl, carboxyl ester, nitriles, amines, silyl, siloxane radicals.

Particularly preferred crosslinkers are allyl methacrylate, ethylene glycol dimethacrylate, diethylene glycol dimethacrylate, triethylene glycol dimethacrylate, tetraethylene and polyethylene glycol dimethacrylate, 1,3-butanediol dimethacrylate, glycerol dimethacrylate, diurethane dimethacrylate, trimethylolpropane trimethacrylate, epoxyacrylates, for example Ebacryl, N',N-methylenebisacrylamide, carbinol, butadiene, isoprene, chloroprene, divinylbenzene and/or bisphenol A dimethylacrylate. These compounds are commercially available, for example, from Sartomer Company Exton, Pa., under the designations CN-120, CN 104 and CN-980.

The use of crosslinkers is optional, and these compounds can usually be used in amounts in the range from 0.05 to 30% by weight, preferably from 0.1 to 20% by weight, particularly preferably from 1 to 10% by weight, based on the weight of the vinyl-containing phosphonic acid.

The mixture of polymers produced in step A) can be a solution, with dispersed or suspended polymer also being able to be present in this mixture.

Preferred polymers include, inter alia, polyolefins such as poly(chloroprene), polyacetylene, polyphenylene, poly(p-xylylene), polyarylmethylene, polystyrene, polymethylstyrene, polyvinyl alcohol, polyvinyl acetate, polyvinyl ether, polyvinylamine, poly(N-vinylacetamide), polyvinylimidazole, polyvinylcarbazole, polyvinylpyrrolidone, polyvinylpyridine, polyvinyl chloride, polyvinylidene chloride, polytetrafluoroethylene, polyvinyl difluoride, polyhexafluoropropylene, polyethylene-tetrafluoroethylene, copolymers of PTFE with hexafluoropropylene, with perfluoropropyl vinyl ether, with trifluoronitroisomethane, with carbalkoxyperfluoroalkoxyvinyl ether, polychlorotrifluoroethylene, polyvinyl fluoride, polyvinylidene fluoride, polyacrolein, polyacrylamide, polyacrylonitrile, polycyanoacrylates, polymethacrylimide, cycloolefinic copolymers, in particular ones derived from norbornene;

polymers having C—O bonds in the main chain, for example polyacetal, polyoxymethylene, polyethers, polypropylene oxide, polyepichlorohydrin, polytetrahydrofuran, polyphenylene oxide, polyether ketone, polyether ether ketone, polyether ether ketone ketone, polyether ketone ether ketone ketone, polyesters, in particular polyhydroxyacetic acid, polyethylene terephthalate, polybutylene terephthalate, polyhydroxybenzoate, polyhydroxypropionic acid, polypropionic acid, polypivalolactone, polycaprolactone, furan resins, phenol-aryl resins, polymalonic acid, polycarbonate;

polymers having C—S bonds in the main chain, for example polysulfide ether, polyphenylene sulfide, polyether sulfone, polysulfone, polyether ether sulfone, polyaryl ether sulfone, polyphenylene sulfone, polyphenylene sulfide sulfone, poly(phenyl sulfide-1,4-phenylene);

polymers having C—N bonds in the main chain, for example polyimines, polyisocyanides, polyetherimine, polyetherimides, poly(trifluoromethylbis(phthalimido)phenyl), polyaniline, polyaramides, polyamides, polyhydrazides, polyurethanes, polyimides, polyazoles, polyazole ether ketone, polyureas, polyazines;

liquid-crystalline polymers, in particular Vectra, and inorganic polymers, for example polysilanes, polycarbosilanes, polysiloxanes, polysilicic acid, polysilicates, silicones, polyphosphazines and polythiazyl.

To achieve a further improvement in the use properties, fillers, in particular proton-conducting fillers, and additional acids can also be added to the membrane. The addition can be carried out, for example, in step A), step B), step C) and/or step D). Furthermore, these additives can, if these are in liquid form, also be added after the polymerization in step D).

Nonlimiting examples of proton-conducting fillers are sulfates such as $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$, phosphates such as $Zr(PO_4)_4$, $Zr(HPO_4)_2$, $HZr_2(PO_4)_3$, $UO_2PO_4 \cdot 3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$, polyacids such as $H_3PW_{12}O_{40} \cdot nH_2O$ (n=21-29), $H_3SiW_{12}O_{40} \cdot nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$, selenides and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, oxides such as $Al_2O_3$, $Sb_2O_5$, $ThO_2$, $SnO_2$, $ZrO_2$, $MoO_3$, silicates such as zeolites, zeolites ($NH_4^+$), sheet silicates, framework silicates, H-natrolites, H-mordenites, $NH_4$-analcines, $NH_4$-sodalites, $NH_4$-gallates, H-montmorillonites, acids such as $HClO_4$, $SbF_5$, fillers such as carbides, in particular SiC, $Si_3N_4$, fibers, in particular glass fibers, glass powders and/or polymer fibers, preferably ones based on polyazoles.

These additives can be present in customary amounts in the proton-conducting polymer membrane, but the positive properties such as high conductivity, long life and high mechanical stability of the membrane should not be impaired too much by addition of excessive amounts of additives. In general, the membrane after the polymerization in step D) contains not more than 80% by weight, preferably not more than 50% by weight and particularly preferably not more than 20% by weight, of additives.

In addition, this membrane can further comprise perfluorinated sulfonic acid additives (preferably 0.1-20% by weight, more preferably 0.2-15% by weight, very particularly preferably 0.2-10% by weight). These additives lead to an increase in power, in the vicinity of the cathode to an increase in the oxygen solubility and oxygen diffusion and to a reduction in the adsorption of phosphoric acid and phosphate onto platinum. (Electrolyte additives for phosphoric acid fuel cells. Gang, Xiao; Hjuler, H. A.; Olsen, C.; Berg, R. W.; Bjerrum, N. J. Chem. Dep. A, Tech. Univ. Denmark, Lyngby, Den. J. Electrochem. Soc. (1993), 140(4), 896-902, and Perfluorosulfonimide as an additive in phosphoric acid fuel cell. Razaq, M.; Razaq, A.; Yeager, E.; DesMarteau, Darryl D.; Singh, S. Case Cent. Electrochem. Sci., Case West. Reserve Univ., Cleveland, Ohio, USA. J. Electrochem. Soc. (1989), 136(2), 385-90.)

Nonlimiting examples of perfluorinated additives are: trifluoromethanesulfonic acid, potassium trifluoromethanesulfonate, sodium trifluoromethanesulfonate, lithium trifluoromethanesulfonate, ammonium trifluoromethanesulfonate, potassium perfluorohexanesulfonate, sodium perfluorohexanesulfonate, lithium perfluorohexanesulfonate, ammonium perfluorohexanesulfonate, perfluorohexanesulfonic acid, potassium nonafluorobutanesulfonate, sodium nonafluorobutanesulfonate, lithium nonafluorobutanesulfonate, ammonium nonafluorobutanesulfonate, cesium nonafluorobutanesulfonate, triethylammonium perfluorohexanesulfonate, perfluorosulfonimides and Nafion.

The formation of the sheet-like structure in step B) is carried out by means of methods known per se (casting, spraying, doctor blade coating, extrusion) which are known from the prior art for the production of polymer films, Accordingly, the mixture is suitable for forming a sheet-like structure. The mixture can accordingly be a solution or suspension, with the proportion of sparingly soluble constituents being restricted to amounts which allow the formation of sheet-like structures. Suitable supports are all supports which are inert under the conditions. These supports include, in particular, films of polyethylene terephthalate (PET), polytetrafluoroethylene (PTFE), polyhexafluoropropylene, copolymers of PTFE with hexafluoropropylene, polyimides, polyphenylene sulfides (PPS) and polypropylene (PP).

To adjust the viscosity, the mixture can, if appropriate, be admixed with water and/or a volatile organic solvent. In this way, the viscosity can be set to the desired value and the formation of the membrane can be made easier.

The thickness of the sheet-like structure is generally from 15 to 2000 μm, preferably from 30 to 1500 μm, in particular from 50 to 1200 μm, without this constituting a restriction.

The polymerization of the vinyl-containing phosphonic acid in step D) preferably occurs by a free-radical mechanism. Free-radical formation can be effected thermally, photochemically, chemically and/or electrochemically.

For example, an initiator solution comprising at least one substance capable of forming free radicals can be added to the mixture after heating of the solution and/or dispersion in step B). Furthermore an initiator solution can be applied to the sheet-like structure obtained in step C). This can be achieved by methods known per se (e.g. spraying, dipping, etc.) which are known from the prior art.

Suitable free-radical formers include, inter alia, azo compounds, peroxy compounds, persulfate compounds or azoamidines. Nonlimiting examples are dibenzoyl peroxide, dicumene peroxide, cumene hydroperoxide, diisopropyl peroxydicarbonate, bis(4-t-butylcyclohexyl) peroxydicarbonate, dipotassium persulfate, ammonium peroxodisulfate, 2,2'-azobis(2-methylpropionitrile) (AIBN), 2,2'-azobis (isobutyroamidine) hydrochloride, benzpinacol, dibenzyl derivatives, methylethylene ketone peroxide, 1,1-azobiscyclohexanecarbonitrile, methyl ethyl ketone peroxide, acetylacetone peroxide, dilauryl peroxide, didecanoyl peroxide, tert-butyl per-2-ethylhexanoate, ketone peroxide, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, tert-butyl peroxyisobutyrate, tert-butyl peroxyacetate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate and also the free-radical formers obtainable from DuPont under the name ®Vazo, for example ®Vazo V50 and ®Vazo WS.

Furthermore, it is also possible to use free-radical formers which form free radicals on irradiation. Preferred compounds include, inter alia, α,α-diethoxyacetophenone (DEAP, Upjon Corp), n-butylbenzoin ether (®Trigonal-14, AKZO) and 2,2-dimethoxy-2-phenylacetophenone (®Igacure 651) and 1-benzoylcyclohexanol (®Igacure, 184), bis(2,4,6-trimethylbenzoyl)phenylphosphine oxide (®Irgacure 819) and 1-[4-(2-hydroxyethoxy)phenyl]-2-hydroxy-2-phenylpropan-1-one (®Irgacure 2959), each of which are commercially available from Ciba Geigy Corp.

It is usual to use from 0.0001 to 5% by weight, in particular from 0.01 to 3% by weight, (based on the weight of the vinyl-containing phosphonic acid) of free-radical formers. The amount of free-radical formers can be varied depending on the desired degree of polymerization.

The polymerization can also be effected by action of IR or NIR (IR=infrared, i.e. light having a wavelength of more than 700 nm; NIR=near IR, i.e. light having a wavelength in the range from about 700 to 2000 nm or an energy in the range from about 0.6 to 1.75 eV).

The polymerization can also be effected by action of UV light having a wavelength of less than 400 nm. This polymerization method is known per se and is described, for example, in Hans Joerg Elias, Makromolekulare Chemie, 5th edition, volume 1, pp. 492-511; D. R. Arnold, N. C. Baird, J. R. Bolton, J. C. D. Brand, P. W. M. Jacobs, P. de Mayo, W. R. Ware, Photochemistry-An Introduction, Academic Press, New York and M. K. Mishra, Radical Photopolymerization of Vinyl Monomers, J. Macromol. Sci.-Revs. Macromol. Chem. Phys. C22 (1982-1983) 409.

The polymerization can also be achieved by action of β-rays, γ-rays and/or electron beams. In a particular embodiment of the present invention, a membrane is irradiated with a radiation dose in the range from 1 to 300 kGy, preferably from 3 to 200 kGy and very particularly preferably from 20 to 100 kGy.

The polymerization of the vinyl-containing phosphonic acid in step D) is preferably carried out at temperatures above room temperature (20° C.) and less than 200° C., in particular at temperatures in the range from 40° C. to 150° C., particularly preferably from 50° C. to 120° C. The polymerization is preferably carried out under atmospheric pressure, but can also be carried out under superatmospheric pressure. The polymerization leads to a strengthening of the sheet-like structure, and this strengthening can be monitored by microhardness measurement. The increase in hardness resulting from the polymerization is preferably at least 20%, based on the hardness of the sheet-like structure obtained in step B).

In a particular embodiment of the present invention, the membranes have a high mechanical stability. This parameter is given by the hardness of the membrane which is determined by means of microhardness measurement in accordance with DIN 50539. For this purpose, the membrane is gradually loaded with a Vickers diamond to a force of 3 mN over a period of 20 s and the indentation depth is determined. According to this, the hardness at room temperature is at least 0.01 N/mm$^2$, preferably at least 0.1 N/mm$^2$ and very particularly preferably at least 1 N/mm$^2$, without a restriction being implied thereby. The force is subsequently kept constant at 3 mN for 5 s and the creep is calculated from the indentation depth. In the case of preferred membranes, the creep $C_{HU}$ 0.003/20/5 under these conditions is less than 20%, preferably less than 10% and very particularly preferably less than 5%. The modulus YHU determined by means of microhardness measurement is at least 0.5 MPa, in particular at least 5 MPa and very particularly preferably at least 10 MPa, without this constituting a restriction.

Depending on the desired degree of polymerization, the sheet-like structure obtained after the polymerization is a self-supporting membrane. The degree of polymerization is preferably at least 2, in particular at least 5, particularly preferably at least 30, repeating units, in particular at least 50 repeating units, very particularly preferably at least 100 repeating units. This degree of polymerization is given by the number average molecular weight $M_n$ which can be determined by GPC methods. Owing to the problems encountered in isolating the polyvinylphosphonic acid present in the membrane without degradation, this value is determined on a sample obtained by polymerization of vinylphosphonic acid without solvent and without addition of polymer. Here, the proportion by weight of vinylphosphonic acid and of free-radical initiators is kept constant in comparison to the ratios after detachment of the membrane. The conversion achieved in a comparative polymerization is preferably greater than or equal to 20%, in particular greater than or equal to 40% and particularly preferably greater than or equal to 75%, based on the vinyl-containing phosphonic acid used.

The polymerization in step D) can lead to a decrease in the layer thickness. The thickness of the self-supporting membrane is preferably in the range from 15 to 1000 µm, more preferably from 20 to 500 µm, in particular from 30 to 250 µm.

The membrane obtained according to step D) is preferably self-supporting, i.e. it can be detached from the support without damage and, if appropriate, subsequently be processed further.

Subsequent to the polymerization in step D), the membrane can be crosslinked thermally, photochemically, chemically and/or electrochemically on the surface. This hardening of the membrane surface brings about an additional improvement in the properties of the membrane.

According to a particular aspect, the membrane can be heated to a temperature of at least 150° C., preferably at least 200° C. and particularly preferably at least 250° C. Thermal crosslinking is preferably carried out in the presence of oxygen. The oxygen concentration in this process step is usually in the range from 5 to 50% by volume, preferably from 10 to 40% by volume, without this constituting a restriction.

Crosslinking can also be effected by action of IR or NIR (IR=infrared, i.e. light having a wavelength of more than 700 nm; NIR=near IR, i.e. light having a wavelength in the range from about 700 to 2000 nm or an energy in the range from about 0.6 to 1.75 eV) and/or UV light. A further method is irradiation with β-rays, γ-rays and/or electron beams. The radiation dose is preferably from 5 to 200 kGy, in particular from 10 to 100 kGy. Irradiation can be carried out in air or under inert gas. The use properties of the membrane, in particular its durability are improved in this way.

Depending on the desired degree of crosslinking, the duration of the crosslinking reaction can vary within a wide range. In general, this reaction time is in the range from 1 second to 10 hours, preferably from 1 minute to 1 hour, without this constituting a restriction.

In a particular embodiment of the present invention, the membrane comprises at least 3% by weight, preferably at least 5% by weight and particularly preferably at least 7% by weight, of phosphorus (as element), based on the total weight of the membrane. The proportion of phosphorus can be determined by elemental analysis. For this purpose, the membrane is dried at 110° C. under reduced pressure (1 mbar) for 3 hours.

The polymer membrane of the invention has improved material properties compared to the previously known doped polymer membranes. In particular, they have, in contrast to known undoped polymer membranes, an intrinsic conductivity. This is based, in particular, on the presence of polymers containing phosphonic acid groups.

The intrinsic conductivity of the membrane of the invention is at least 0.001 S/cm, preferably at least 10 mS/cm, in particular at least 20 mS/cm, at a temperature of 120° C.

The specific conductivity is measured by means of impedance spectroscopy in a four-pole arrangement in the potentiostatic mode using platinum electrodes (wire, 0.25 mm diameter). The distance between the current-collecting electrodes is 2 cm. The spectrum obtained is evaluated using a simple model consisting of a parallel arrangement of an ohmic resistance and a capacitor. The specimen cross section of the membrane doped with phosphoric acid is measured immediately before mounting of the specimen. To measure the temperature dependence, the measurement cell is brought to the desired temperature in an oven and the temperature is regulated by means of a Pt-100 resistance thermometer positioned in the immediate vicinity of the specimen. After the temperature has been reached, the specimen is maintained at this temperature for 10 minutes before commencement of the measurement.

The crossover current density in operation using 0.5 M methanol solution at 90° C. in a liquid direct methanol fuel cell is preferably less than 100 mA/cm$^2$, in particular less than 70 mA/cm$^2$, particularly preferably less than 50 mA/cm$^2$ and very particularly preferably less than 10 mA/cm$^2$. The crossover current density in operation using a 2 M methanol solution at 160° C. in a gaseous direct methanol fuel cell is preferably less than 100 mA/cm$^2$, in particular less than 50 mA/cm$^2$, very particularly preferably less than 10 mA/cm$^2$.

To determine the crossover current density, the amount of carbon dioxide liberated at the cathode is measured by means of a $CO_2$ sensor. The crossover current density is calculated from the resulting value of the amount of $CO_2$, in the manner described by P. Zelenay, S. C. Thomas, S. Gottesfeld in S. Gottesfeld, T. F. Fuller "Proton Conducting Membrane Fuel Cells II" ECS Proc. Vol. 98-27, pp. 300-308.

Possible fields of use of the intrinsically conductive polymer membranes of the invention include, inter alia, use in fuel cells, in electrolysis, in capacitors and in battery systems. Owing to their property profile, the polymer membranes are preferably used in fuel cells, in particular in DMFCs (direct methanol fuel cells).

The present invention also provides a membrane-electrode unit which comprises at least one polymer membrane according to the invention. The membrane-electrode unit displays a high performance even at a low content of catalytically active substances, such as platinum, ruthenium or palladium. Gas diffusion layers provided with a catalytically active layer can be used for this purpose.

The gas diffusion layer generally displays electron conductivity. Sheet-like, electrically conductive and acid-resistant structures are usually used for this purpose. These include, for example, carbon fiber papers, graphitized carbon fiber papers, woven carbon fiber fabrics, graphitized woven carbon fiber fabrics and/or sheet-like structures which have been made conductive by addition of carbon black. The catalytically active layer comprises a catalytically active substance. Such substances include, inter alia, noble metals, in particular platinum, palladium, rhodium, iridium and/or ruthenium. These substances can also be used in the form of alloys with one another. Furthermore, these substances can also be used in alloys with base metals such as Cr, Zr, Ni, Co and/or Ti. In addition, the oxides of the abovementioned noble metals and/or base metals can also be used. According to a particular aspect of the present invention, the catalytically active compounds are used in the form of particles which preferably have a size in the range from 1 to 1000 nm, in particular from 10 to 200 nm and particularly preferably from 20 to 100 nm.

Furthermore, the catalytically active layer can further comprise customary additives. Such additives include, inter alia, fluoropolymers such as polytetrafluoroethylene (PTFE) and surface-active substances.

In a particular embodiment of the present invention, the weight ratio of fluoropolymer to catalyst material comprising at least one noble metal and, if appropriate, one or more support materials is greater than 0.1, preferably in the range from 0.2 to 0.6.

In a particular embodiment of the present invention, the catalyst layer has a thickness in the range from 1 to 1000 μm, in particular from 5 to 500 μm, preferably from 10 to 300 μm. This value represents a mean which can be determined by measuring the layer thickness in cross-sectional micrographs which can be obtained using a scanning electron microscope (SEM).

In a particular embodiment of the present invention, the noble metal content of the catalyst layer is from 0.1 to 10.0 mg/cm$^2$, preferably from 0.2 to 6.0 mg/cm$^2$ and particularly preferably from 0.3 to 3.0 mg/cm$^2$. These values can be determined by elemental analysis of a sheet-like sample.

For further information on membrane-electrode units, reference may be made to the specialist literature, in particular the patent applications WO 01/18894 A2, DE 195 09 748, DE 195 09 749, WO 00/26982, WO 92/15121 and DE 197 57 492. The disclosure of the abovementioned references in respect of the structure and the production of membrane-electrode units and also the electrodes, gas diffusion layers and catalysts to be selected is incorporated by reference into the present description.

In a further variant, a catalytically active layer can be applied to the membrane of the invention and be joined to a gas diffusion layer.

In one variant of the present invention, the membrane can be formed directly on the electrode rather than on a support. The treatment according to step D) can be correspondingly shortened as a result or else the amount of initiator solution can be reduced, since the membrane no longer has to be self-supporting. Such a membrane or an electrode coated with such a polymer membrane according to the invention is also provided by the present invention.

Furthermore, it is also possible to carry out the polymerization of the vinyl-containing phosphonic acid in the laminated membrane-electrode unit. For this purpose, the solution is applied to the electrode and placed against the second, if appropriate likewise coated, electrode and the two are pressed. The polymerization is subsequently carried out as described above in the laminated membrane-electrode unit.

The coating has a thickness in the range from 2 to 500 µm, preferably from 5 to 300 µm, in particular from 10 to 200 µm. This makes it possible for it to be used in micro-fuel cells, in particular in DM micro-fuel cells.

An electrode which has been coated in this way can be installed in a membrane-electrode unit having, if appropriate, at least one polymer membrane according to the invention.

In a further variant, a catalytically active layer can be applied to the membrane of the invention and be joined to a gas diffusion layer. For this purpose, a membrane is formed by means of the steps A) to D) and the catalyst is applied. In one variant, the catalyst can be applied before or together with the initiator solution. These structures are also provided by the present invention.

Furthermore, the formation of the membrane by means of the steps A) to D) can also be carried out on a support or a support film on which the catalyst is present. After removal of the support or the support film, the catalyst is located on the membrane of the invention. These structures are also provided by the present invention.

The present invention likewise provides a membrane-electrode unit which comprises at least one coated electrode and/or at least one polymer membrane according to the invention in combination with a further polymer membrane based on polyazoles or a polymer blend membrane comprising at least one polymer based on polyazoles.

The invention claimed is:

1. A proton-conducting polymer membrane comprising polymers containing phosphonic acid groups which is obtained by a process comprising the steps A) mixing at least 20% by weight of based on the total weight of the mixture of vinyl-containing phosphonic acid with one or more aromatic tetraamino compounds with one or more aromatic carboxylic acids, esters thereof, acid halides thereof or anhydrides thereof which contain at least two acid groups per carboxylic acid monomer, and/or mixing of vinyl-containing phosphonic acid with one or more aromatic and/or heteroaromatic diamino carboxylic acids, esters thereof, acid halides thereof or anhydrides thereof, B) heating of the mixture obtainable according to step A) under inert gas at temperatures of up to 350° C. to form a polyazole polymer, C) application of a layer using the mixture from step A) and/or B) to a support, D) polymerization of the vinyl-containing phosphonic acid present in the sheet-like structure obtainable according to step C)

and wherein the membrane has a proton conductivity of at least 0.001 S/cm @ 120° C.

2. The membrane as claimed in claim 1, characterized in that 3,3',4,4'-tetraminobiphenyl, 2,3,5,6-tetraminopyridine, 1,2,4,5-tetraminobenzene, bis(3,4-diaminophenyl)sulfone, bis(3,4-diaminophenyl)ether, 3,3',4,4'-tetraminobenzophenone, 3,3',4,4'-tetraminodiphenylmethane and 3,3',4,4'-tetraminodiphenyldimethylmethane are used as aromatic tetramino compounds.

3. The membrane as claimed in claim 1, characterized in that isophthalic acid, terephthalic acid, phthalic acid, 5-hydroxyisophthalic acid, 4-hydroxyisophthalic acid, 2-hydroxytereplithalic acid, 5-aminoisophthalic acid, 5-N,N-dimethylaminoisophthalic acid, 5-N,N-diethylaminoisophthalic acid, 2,5-dihydroxyterephthalic acid, 2,5-dihydroxyisophthalic acid, 2,3-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl)ether, benzophenone-4,4'-dicarboxylic acid, bis(4-carboxyphenyl)sulfone, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid, or C1-C20-alkyl esters or C5-C12-aryl esters thereof, or anhydrides thereof or acid chlorides thereof are used as aromatic carboxylic acids.

4. The membrane as claimed in claim 1, characterized in that tricarboxylic acids, C1-C20-alkyl esters thereof, C5-C12-aryl esters thereof, anhydrides thereof or acid chlorides thereof or tetracarboxylic acids, C1-C20-alkyl esters thereof, C5-C12-aryl esters thereof, anhydrides thereof or acid chlorides thereof are used as aromatic carboxylic acids.

5. The membrane as claimed in claim 4, characterized in that the content of tricarboxylic acids and/or tetracarboxylic acids is in the range 0.5 to 10 mol %, based on dicarboxylic acid used.

6. The membrane as claimed in claim 4, characterized in that 1,3,5-benzenetricarboxylic acid (trimesic acid); 2,4,5-benzenetricarboxylic acid (trimellitic acid); (2-carboxyphenyl)iminodiacetic acid, 3,5,3'-biphenyltricarboxylic acid; 3,5,4'-biphenyltricarboxylic acid, 2,4,6-pyridinetricarboxylic acid, benzene-1,2,4,5-tetracarboxylic acid; naphthalene-1,4,5,8-tetracarboxylic acid, 3,5,3',5'-biphenyltetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid and/or 1,4,5,8-naphthalenetetracarboxylic acid are used as aromatic carboxylic acids.

7. The membrane as claimed in claim 4, characterized in that the content of tricarboxylic acids and/or tetracarboxylic acids is in the range from 0 to 30 mol % based on dicarboxylic acid used.

8. The membrane as claimed in claim 1, characterized in that heteroaromatic dicarboxylic acids, heteroaromatic tricarboxylic acids and/or heteroaromatic tetracarboxylic acids containing at least one nitrogen, oxygen, sulfur or phosphorus atom in the aromatic are used as hetero aromatic carboxylic acids.

9. The membrane as claimed in claim 8, characterized in that pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also C1-C20-alkyl esters or C5-C12-aryl esters thereof, or anhydrides thereof or acid chlorides thereof or C1-C20-alkyl esters or C5-C12-aryl esters thereof or anhydrides thereof or acid chlorides thereof are used.

10. The membrane as claimed in claim 1, characterized in that diaminobenzoic acid and/or monohydrochloride and dihydrochloride derivatives thereof are used as aromatic diamino carboxylic acids.

11. The membrane as claimed in claim 1, characterized in that the mixture prepared in step A) and/or step B) comprises compounds of the formula

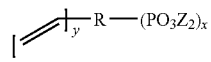

where
R is a bond, a C1-C15-alkyl group, C1-C15-alkoxy group, ethylenoxy group or C5-C20-aryl or heteroaryl group, with the above radicals themselves being able to be substituted by halogen, —OH, COOZ, —CN, or $NZ_2$,
the radicals Z are each, independently of one another, hydrogen, a C1-C15-alkyl group, C1-C15-alkoxy group, ethylenoxy group or C5-C20-aryl or heteroaryl group, with the above radicals themselves being able to be substituted by halogen, —OH, or —CN, and
x is 1, 2, 3, 4, 5, 6, 7, 8, 9 or 10,
y is 1, 2, 3, 4, 5, 6, 7, 8, 9 or 10,
and/or of the formula

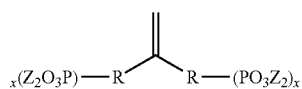

where
R is a bond, a C1-C15-alkyl group, C1-C15-alkoxy group, ethylenoxy group or C5-C20-aryl or heteroaryl group, with the above radicals themselves being able to be substituted by halogen, —OH, COOZ —CN, or $NZ_2$,
the radicals Z are each, independently of one another, hydrogen, a C1-C15-alkyl group, C1-C15-alkoxy group, ethylenoxy group or C5-C20-aryl or heteroaryl group, with the above radicals themselves being able to be substituted by halogen, —OH, or —CN, and
x is 1, 2, 3, 4, 5, 6, 7, 8, 9 or 10,
and/or of the formula

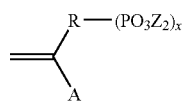

where
A is a group of the formulae $COOR^2$, CN, $CONR^2_2$, $OR^2$ and/or $R^2$, where $R^2$ is hydrogen, a C1-C15-alkyl group, C1-C15-alkoxy group, ethylenoxy group or C5-C20-aryl or heteroaryl group, with the above radicals themselves being able to be substituted by halogen, —OH, COOZ, —CN, or $NZ_2$, R is a bond, a divalent C1-C15-alkylene group, divalent C1-C15-alkylenoxy group, for example ethylenoxy group, or divalent C5-C20-aryl or heteroaryl group, with the above radicals themselves being able to be substituted by halogen, —OH, COOZ, —CN, or $NZ_2$,
the radicals Z are each, independently of one another, hydrogen, a C1-C15-alkyl group, C1-C15-alkoxy group, ethylenoxy group or C5-C20-aryl or heteroaryl group, with the above radicals themselves being able to be substituted by halogen, —OH, or —CN, and
x is 1, 2, 3, 4, 5, 6, 7, 8, 9 or 10.

12. The membrane as chimed in claim 1, characterized in that monomers which are capable of effecting crosslinking and have at least 2 carbon-carbon double bonds are polymerized in step D).

13. The membrane as claimed in claim 1, characterized in that the polymerization in step D) is brought about by substance capable of forming free radicals.

14. The membrane as claimed in claim 1, characterized in that the polymerization in step D) is effected by irradiation with IR or NIR light, UV light, β-rays, γ-rays and/or electron beams.

15. The membrane as claimed in claim 1, characterized in that the mixture produced in step A) and/or step B) comprises dissolved, dispersed and/or suspended polymer.

16. The membrane as claimed in claim 1, characterized in that a layer having a thickness of from 20 to 4000 μm is produced in step C).

17. The membrane as claimed in claim 1, characterized in that the membrane formed in step D) has a thickness in the range from 15 to 3000 μm.

18. The membrane as claimed in claim 1, wherein the membrane has a proton conductivity of at least 10 S/cm @ 120 μC.

19. The membrane as claimed in claim 1, wherein the membrane has a proton conductivity of at least 20 S/cm @ 120° C.

20. The membrane as claimed in claim 1, wherein the vinyl-containing phosphonic acid is present in step A) in an amount of at least 30% by weight of based on the total weight of the mixture.

21. The membrane as claimed in claim 1, wherein the vinyl-containing phosphonic acid is present in step A) in an amount of at least 50% by weight of based on the total weight of the mixture.

22. The membrane as claimed in claim 1, wherein the polyazole polymer formed in step B) has recurring azole units in the polymer greater than or equal to 10.

23. The membrane as claimed in claim 1, wherein the polyazole polymer formed in step B) has recurring azole units in the polymer greater than or equal to 100.

24. The membrane as claimed in claim 19, wherein the polyazole polymer formed in step B) has recurring azole units in the polymer greater than or equal to 100 and wherein the vinyl-containing phosphonic acid is present in step A) in an amount of at least 50% by weight of based on the total weight of the mixture.

25. A membrane-electrode unit comprising at least one electrode and at least one membrane as claimed in claim 1.

26. A fuel cell comprising one or more membrane-electrode units as claimed in claim 25.

* * * * *

UNITED STATES PATENT AND TRADEMARK OFFICE
CERTIFICATE OF CORRECTION

PATENT NO. : 7,727,651 B2
APPLICATION NO. : 10/522839
DATED : June 1, 2010
INVENTOR(S) : Joachim Kiefer et al.

Page 1 of 1

It is certified that error appears in the above-identified patent and that said Letters Patent is hereby corrected as shown below:

In claim 18, line 2 (column 26, line 33) delete "S/cm" and insert -- mS/cm --.

In claim 18, line 3 (column 26, line 34) delete "µC" and insert -- °C --.

In claim 19, line 2 (column 26, line 36) delete "S/cm" and insert -- mS/cm --.

Signed and Sealed this
Eighteenth Day of October, 2011

David J. Kappos
*Director of the United States Patent and Trademark Office*